US012608632B2

(12) United States Patent
Okawa et al.

(10) Patent No.: US 12,608,632 B2
(45) Date of Patent: Apr. 21, 2026

(54) ERROR DETECTION DEVICE, ERROR DETECTION METHOD, AND ERROR DETECTION PROGRAM

(71) Applicant: NIPPON TELEGRAPH AND TELEPHONE CORPORATION, Tokyo (JP)

(72) Inventors: Maya Okawa, Tokyo (JP); Hiroyuki Toda, Tokyo (JP)

(73) Assignee: NTT, Inc., Tokyo (JP)

( * ) Notice: Subject to any disclaimer, the term of this patent is extended or adjusted under 35 U.S.C. 154(b) by 1110 days.

(21) Appl. No.: 17/617,994

(22) PCT Filed: Jun. 11, 2019

(86) PCT No.: PCT/JP2019/023151
§ 371 (c)(1),
(2) Date: Dec. 10, 2021

(87) PCT Pub. No.: WO2020/250312
PCT Pub. Date: Dec. 17, 2020

(65) Prior Publication Data
US 2022/0261673 A1     Aug. 18, 2022

(51) Int. Cl.
*G06F 18/214*        (2023.01)
*G06N 7/01*          (2023.01)

(52) U.S. Cl.
CPC ............. *G06N 7/01* (2023.01); *G06F 18/214* (2023.01)

(58) Field of Classification Search
CPC ................................ G06N 7/01; G06F 18/214
See application file for complete search history.

(56) References Cited

U.S. PATENT DOCUMENTS 11,163,277 B2 * 11/2021 Kawanoue ............. G05B 17/02

OTHER PUBLICATIONS

Laptev, N., et al, Generic and Scalable Framework for Automated Time-series Anomaly Detection, Retrieved from Internet:<https://dl.acm.org/doi/abs/10.1145/2783258.2788611> (Year: 2015).*
Akouemo, et al, Probabilistic anomaly detection in natural gas time series, Retrieved from Internet:<https://www.sciencedirect.com/science/article/pii/S016920701500076X> (Year: 2016).*

(Continued)

*Primary Examiner* — Miranda M Huang
*Assistant Examiner* — Bart I Rylander

(57) ABSTRACT

An object is to make it possible to accurately detect abnormality of event data.

A training unit (105) trains a parameter of a model based on a plurality of event series that are event data in a time series and labels that indicate abnormality or normality with respect to event data of each of the plurality of event series, the model outputting a degree of abnormality of a target event series when the target event series is input, the target event series being an event series of which the degree of abnormality is to be predicted, the parameter being trained to optimize an objective function that represents a relationship between a probability of occurrence of an event at each time point in the time series and a degree of abnormality of each of the plurality of event series.

17 Claims, 5 Drawing Sheets

(56) References Cited

OTHER PUBLICATIONS

Alves, R., et al, Burstiness Scale: A Parsimonius Model for Characterizing Random Series Events, Retrieved from Internet:<https://dl.acm.org/doi/abs/10.1145/2939672.2939852> (Year: 2016).*

Efat, I., et al, Trend Estimation of Stock Market: An Intelligent Decision System, Retrieved from Internet:<https://www.researchgate.net/profile/Touhid-Bhuiyan/publication/384361998_Proceedings_of_the_ICONCS_2018/links/> (Year: 2018).*

Kupilik, M., et al, Spatio-temporal violent event prediction using Gaussian process regression, Retrieved from Internet:<https://link.springer.com/article/10.1007/s42001-018-0024-y> (Year: 2018).*

Liao, B., et al, Dest-ResNet: A Deep Spatiotemporal Residual Network for Hotspot Traffic Speed Prediction, Retrieved from Internet:<https://dl.acm.org/doi/abs/10.1145/3240508.3240656> (Year: 2018).*

Shipmon, D., et al, Time Series Anomaly Detection: Detection of Anomalous Drops with Limited Features and Sparse Examples in Noise Highly Periodic Data, Retrieved from Internet:<https://arxiv.org/abs/1708.03665> (Year: 2017).*

Zhang, X., et al, Cross-dataset Time Series Anomaly Detection for Cloud Systems, Retrieved from Internet:<https://www.usenix.org/conference/atc19/presentation/zhang-xu> (Year: 2019).*

Zhou, C., et al, Predicting the passenger demand on bus services for mobile users, Retrieved from Internet:<https://www.sciencedirect.com/science/article/pii/S157411921500187X> (Year: 2016).*

Ihler et al. (2006) "Adaptive event detection with time-varying poisson processes" Proceedings of the 12th ACMSIGKDD international conference on Knowledge discovery and data mining, Aug. 20, 2006.

Vahedian et al. (2019) "Predicting urban dispersal events: A two-stage framework through deep survival analysis on mobility data" AAAI Conference on Artificial Intelligence, IEEE, Jan. 27, 2019.

* cited by examiner

Fig. 3

| SEARCH TARGET AREA | SEARCH TARGET DATE | SEARCH TARGET TIME | SEARCH LOG |
|---|---|---|---|
| A STATION | 2018/1/2 | 10:00 | 1,3,3,10,12,... |
| B STATION | 2018/1/4 | 12:00 | 5,10,10,12,,... |
| ⋮ | | ⋮ | ⋮ |
| C STATION | 2018/12/30 | 21:00 | 1,1,2,3,5,... |

Fig. 4

| SEARCH TARGET AREA | SEARCH TARGET DATE | SEARCH TARGET TIME | ABNORMALITY (CONGESTION) |
|---|---|---|---|
| A STATION | 2018/1/2 | 10:00 | 1 (CONGESTED) |
| B STATION | 2018/1/4 | 12:00 | 0 (NOT CONGESTED) |
| ⋮ | | ⋮ | ⋮ |
| C STATION | 2018/12/30 | 21:00 | 0 (NOT CONGESTED) |

ABNORMALITY DETECTION
PROCESSING ROUTINE

S101     ACQUIRE DATA SET AND LABELS

S102     TRAIN PARAMETER

S103     STORE PARAMETER

S104     INPUT TARGET EVENT SERIES

S105     ACQUIRE PARAMETER

S106     CALCULATE DEGREE OF ABNORMALITY
OF TARGET EVENT SERIES

S107     OUTPUT

END

ERROR DETECTION DEVICE, ERROR DETECTION METHOD, AND ERROR DETECTION PROGRAM

CROSS-REFERENCE TO RELATED APPLICATIONS

This application is a U.S. National Stage Application filed under 35 U.S.C. § 371 claiming priority to International Patent Application No. PCT/JP2019/023151, filed on 11 Jun. 2019, the disclosure of which is hereby incorporated herein by reference in its entirety.

TECHNICAL FIELD

The present disclosure relates to an abnormality detection device, an abnormality detection method, and an abnormality detection program.

BACKGROUND ART

Abnormality detection in which the degree of abnormality of event data is determined is conventionally a technology that is essential in many domains. For example, if abnormality of a series of data regarding financial transactions can be detected, a fraudulent transaction can be automatically identified. If abnormality of a series of data regarding a taxi boarding/alighting history can be detected, it is possible to identify a congested place and immediately take preliminary measures. Event data is data that is constituted by a series of time points/places at which a phenomenon occurred, and is commonly modeled using a point process (NPL 1).

Although some models for detecting abnormality of event data were proposed in the past, many of the proposed models assume cases where correct answer data that indicates abnormality is not provided. On the other hand, with respect to a case where correct answer labels that indicate abnormality or normality are provided in advance, a technology for performing supervised abnormality prediction of traffic demand based on discrete feature values has been proposed (NPL 2), for example.

CITATION LIST

Non Patent Literature

[NPL 1] Ihler, Alexander, Jon Hutchins, and Padhraic Smyth. "Adaptive event detection with time-varying poisson processes". Proceedings of the 12th ACM SIGKDD international conference on Knowledge disco very and data mining. ACM, 2006.
[NPL 2] A. Vahedian, X. Zhou, L. Tong, W. N. Street, and Y. Li., "Predicting urban dispersal events: A two-stage framework through deep survival analysis on mobility data", AAAI Conference on Artificial Intelligence, IEEE, 2018.

SUMMARY OF THE INVENTION

Technical Problem

Detecting abnormality of event data is very valuable in various domains. However, event data cannot be considered with existing methods for supervised abnormality detection. For example, the method described in NPL 2 deals with accumulated feature values, and therefore cannot be applied to event data. Therefore, there is a problem in that abnormality of event data cannot be accurately detected.

A technology disclosed herein was made in view of the foregoing, and has an object of providing an abnormality detection device, an abnormality detection method, and an abnormality detection program that make it possible to accurately detect abnormality of event data.

Means for Solving the Problem

A first aspect of the present disclosures is an abnormality detection device that includes a training unit configured to train a parameter of a model based on a plurality of event series that are event data in a time series and labels that indicate abnormality or normality with respect to event data of each of the plurality of event series, the model outputting a degree of abnormality of a target event series when the target event series is input, the target event series being an event series of which the degree of abnormality is to be predicted, the parameter being trained to optimize an objective function that represents a relationship between a probability of occurrence of an event at each time point in the time series and a degree of abnormality of each of the plurality of event series.

A second aspect of the present disclosure is an abnormality detection method that includes training, by a training unit, a parameter of a model based on a plurality of event series that are event data in a time series and labels that indicate abnormality or normality with respect to event data of each of the plurality of event series, the model outputting a degree of abnormality of a target event series when the target event series is input, the target event series being an event series of which the degree of abnormality is to be predicted, the parameter being trained to optimize an objective function that represents a relationship between a probability of occurrence of an event at each time point in the time series and a degree of abnormality of each of the plurality of event series.

A third aspect of the present disclosure is an abnormality detection program for causing a computer to execute processing that includes training, by a training unit, a parameter of a model based on a plurality of event series that are event data in a time series and labels that indicate abnormality or normality with respect to event data of each of the plurality of event series, the model outputting a degree of abnormality of a target event series when the target event series is input, the target event series being an event series of which the degree of abnormality is to be predicted, the parameter being trained to optimize an objective function that represents a relationship between a probability of occurrence of an event at each time point in the time series and a degree of abnormality of each of the plurality of event series.

Effects of the Invention

According to the disclosed technology, abnormality of event data can be accurately detected.

BRIEF DESCRIPTION OF DRAWINGS

FIG. 3 is a diagram showing an example of a search history.

FIG. 4 is a diagram showing an example of an abnormality label.

DESCRIPTION OF EMBODIMENTS

Figure 1:
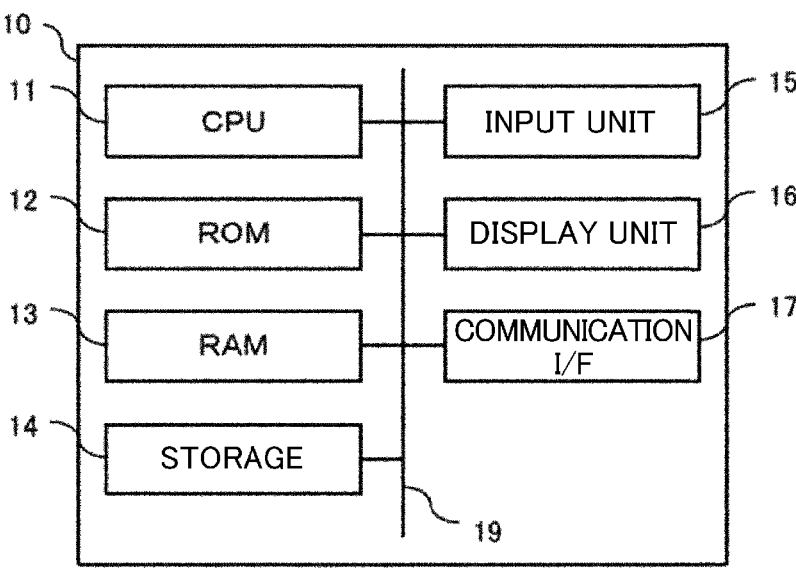
FIG. 1 is a block diagram showing a schematic configuration of a computer that functions as an abnormality detection device according to an embodiment.

The following describes an example embodiment of the disclosed technology with reference to the drawings. Note that constitutional elements and portions that are the same or equivalent are denoted with the same reference signs in the drawings. Dimensional ratios shown in the drawings are exaggerated for the sake of convenience of description, and may differ from actual ratios.

Configuration of Abnormality Detection Device According to Embodiment of Technology of Present Disclosure FIG. 1 is a block diagram showing a hardware configuration of an abnormality detection device 10 according to the present embodiment. As shown in FIG. 1, the abnormality detection device 10 includes a CPU (Central Processing Unit) 11, a ROM (Read Only Memory) 12, a RAM (Random Access Memory) 13, a storage 14, an input unit 15, a display unit 16, and a communication interface (I/F) 17. The constitutional elements are communicably connected to each other via a bus 19.

The CPU 11 is a central processing unit, and executes various programs and controls each unit. That is, the CPU 11 reads programs from the ROM 12 or the storage 14 and executes the programs using the RAM 13 as a work area. The CPU 11 controls the constitutional elements described above and performs various types of computation processing, following programs stored in the ROM 12 or the storage 14. In the present embodiment, an abnormality detection program for executing abnormality detection processing is stored in the ROM 12 or the storage 14.

Various programs and various types of data are stored in the ROM 12. A program or data is temporarily stored in the RAM 13 that serves as a work area. The storage 14 is constituted by a HDD (Hard Disk Drive) or a SSD (Solid State Drive), and various programs including an operating system and various types of data are stored in the storage 14.

The input unit 15 includes a pointing device such as a mouse and a keyboard, and is used for various types of input.

The display unit 16 is a liquid crystal display, for example, and displays various types of information. A touch panel system may also be adopted so that the display unit 16 also functions as the input unit 15.

The communication interface 17 is an interface for communicating with other devices, and a standard such as Ethernet (registered trademark), FDDI, or Wi-Fi (registered trademark) is used, for example.

Figure 2:
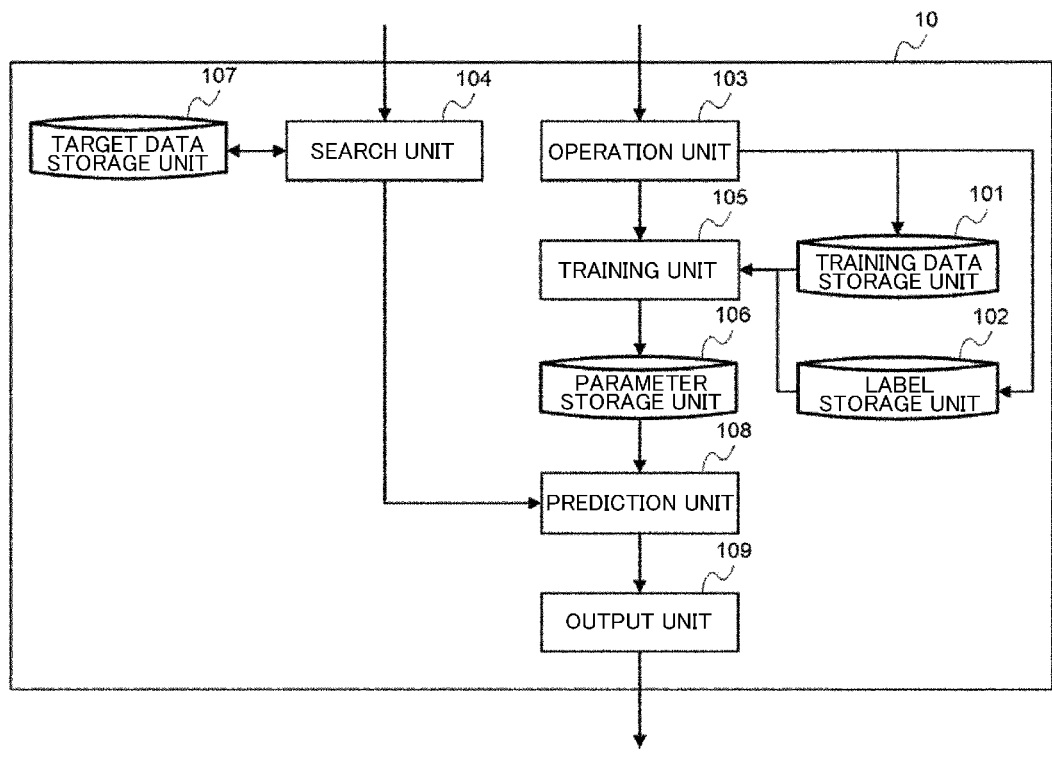
FIG. 2 is a block diagram showing an example of a functional configuration of the abnormality detection device according to the embodiment.

Next, a functional configuration of the abnormality detection device 10 will be described. FIG. 2 is a block diagram showing an example of the functional configuration of the abnormality detection device 10.

As shown in FIG. 2, the abnormality detection device 10 includes a training data storage unit 101, a label storage unit 102, an operation unit 103, a search unit 104, a training unit 105, a parameter storage unit 106, a target data storage unit 107, a prediction unit 108, and an output unit 109 as functional units. Each functional unit is realized as a result of the CPU 11 reading the abnormality detection program stored in the ROM 12 or the storage 14, loading the program into the RAM 13, and executing the program.

A plurality of event series that are event data in a time series are stored in the training data storage unit 101. Specifically, the training data storage unit 101 reads event series and gives the read event series to the training unit 105, following a request from the training unit 105. Event data is data that is constituted by a series of time points and places at which a phenomenon (event) occurred, and examples of event data include a record of transactions that are made in a financial market, a taxi boarding/alighting history, a purchase history in an E-commerce site, and a crime history. More specifically, event data is, for example, a search log of a route search application and is defined as an event series $x=\{\chi_1, \chi_2, \ldots\}$ of time points $\chi_j$ at which searches were carried out with respect to an area (station etc.) $l_i$, a date $d_i$, and a time $h_i$. Note that "x" representing the "event series x" is shown as a bold letter x in mathematical expressions. In the present disclosure, a case where a data set $X=\{x_i\}^n_{i=1}$ is given will be considered, the data set X being constituted by n event series x that are observed by a time point T. The length of each event series $x_i$ is represented by $n_i$.

FIG. 3 shows an example of event data that is search logs (histories). As shown in FIG. 3, search logs are stored in the training data storage unit 101 in association with search target areas, search target dates, and search target times. For example, time points $\chi_j$ (1, 3, 12, etc.) at which searches were carried out with respect to a search target area $l_i$ "A station", a search target date $d_i$ "2018/1/2", and a search target time $h_i$ "10:00" are stored in time series as a search log in FIG. 3.

Labels that indicate abnormality or normality with respect to event data of each of the plurality of event series are stored in the label storage unit 102. Specifically, the label storage unit 102 reads labels indicating abnormality or normality and gives the read labels to the training unit 105, following a request from the training unit 105. Labels indicating abnormality or normality indicate, for example, "whether or not a fraudulent transaction was carried out" or "whether or not a stock price violently fluctuated" in the case of financial transactions, or "whether or not congestion occurred at the time of boarding/alighting" in the case of a taxi boarding/alighting history, which is acquired manually or automatically. In the present disclosure, it is assumed that labels $Y=\{y_i\}^n_{i=1}$ that correspond to each of the area $l_i$, the date $d_i$, and the time zone $h_i$ are given together with the data set X constituted by the n event series x. Here, $y_i$ is binary data $y_i \in [0, 1]$ that indicates, for example, whether or not congestion occurred at the area $l_i$, the date $d_i$, and the time zone $h_i$.

FIG. 4 shows an example of labels in a case where event data is the search logs described above. Items under "abnormality" in FIG. 4 are labels. In the example shown in FIG. 4, a label takes the value of 1 (congested) if corresponding event data is abnormal (congestion occurred), and takes the value of 0 (not congested) if corresponding event data is normal (congestion did not occur).

Note that the training data storage unit 101 and the label storage unit 102 can also be configured as a Web server or a database server that includes a database, for example.

The operation unit 103 accepts various operations with respect to data stored in the training data storage unit 101 and the label storage unit 102. The various operations include operations for registering, correcting, and deleting data, for example.

The search unit 104 accepts input of a target event series $x'_j$. Specifically, the search unit 104 first accepts information regarding time points and places with respect to an event series of which the degree of abnormality is to be predicted. Next, the search unit 104 acquires event data that is associated with the accepted time points and places from the target data storage unit 107 as the target event series $x'_j$. Then, the search unit 104 gives the target event series $x'_i$ to the prediction unit 108.

The training unit 105 trains a parameter of a model based on a plurality of event series x and labels y that indicate abnormality or normality with respect to event data of each of the plurality of event series x, the model outputting a degree of abnormality s' of a target event series x' when the target event series x' is input, the target event series x' being an event series of which the degree of abnormality is to be predicted, the parameter being trained to optimize an objective function L that represents a relationship between a probability of occurrence of an event at each time point in a time series and a degree of abnormality of each of the plurality of event series x.

Specifically, the training unit 105 first acquires the data set X from the training data storage unit 101 and acquires the labels Y from the label storage unit 102. Next, based on the acquired data set X and labels Y, the training unit 105 trains a parameter of a model that indicates a relationship between an event series x and a degree of abnormality s of the event series x.

Here, a procedure of training the parameter in the training unit 105 will be described. In the training unit 105, an event that is triggered by a past event is modeled using a point process. First, an intensity function is designed in accordance with a procedure of a common point process model. The intensity function is a function that represents an occurrence probability that is the probability of occurrence of an event per unit time. An example will be described below.

First, an intensity function $\lambda(x|\theta)$ of a point process is introduced to model an event series. Here, the intensity function $\lambda(x|\theta)$ represents the probability of occurrence of an event (search) at a time point x, and $\theta$ is a parameter of the intensity function. When the intensity function $\lambda(x|\theta)$ is given, a likelihood $Z_i$ of the point process with respect to an i-th event series $x_i = \{\chi_1, \ldots \chi_{ni}\}$ can be expressed with the following Expression (1).

[Math. 1]

$$Z_i \equiv \log p(x_i \mid \lambda(x; \theta)) = \sum_{j=1}^{n_i} \lambda(x_j; \theta) - \int_0^T \lambda(x; \theta)dx \qquad (1)$$

In a framework of a common point process, $\theta$ that maximizes a sum $\Sigma''_{i=1}Z_i$ of likelihoods $Z_i$ of respective event series is found. In the present disclosure, an objective function that maximizes the sum of likelihoods $Z_i$ is expressed with the following Expression (2).

[Math. 2]

$$\mathcal{L} = \sum_{i=1}^{n} D(y_i \mid f(Z_i; \beta)) \qquad (2)$$

Here, D(A|B) is a criterion that represents a degree of deviation between A and B, and a square error or the like can be used, for example. Also, f(•) is a linear regression model, and $\beta$ is a parameter of the linear regression model. The training unit 105 trains the parameters $\theta$ and $\beta$ such that the above Expression (2) is maximized. Any method may be used for the optimization. For example, the objective function of the above Expression (2) can be optimized using a gradient method. Then, the training unit 105 stores the trained parameters $\hat{\theta}$ (in mathematical expressions, "^" is shown above $f$) and $\hat{\beta}$ in the parameter storage unit 106.

A pair of the parameters $\hat{\theta}$ and $\hat{\beta}$ trained by the training unit 105 is stored in the parameter storage unit 106. There is no limitation on the parameter storage unit 106 so long as the set of estimated parameters can be saved and restored. For example, the set of estimated parameters is stored in a database or a specific area of a general-purpose storage device (memory or hard disk device) that is provided in advance.

An event series x' of which the degree of abnormality is to be predicted is stored in the target data storage unit 107. Similarly to event data stored in the training data storage unit 101, event data is defined as an event series $x' = \{\chi'_1, \chi'_2, \ldots\}$ of time points $\chi'_j$. In the present disclosure, it is assumed that a data set $X' = \{x'_i\}^{n'}_{i=1}$ that is constituted by n' event series x' observed by the time point T is given. Also, the length of each event series $x'_i$ is represented by $n'_i$.

The prediction unit 108 calculates the degree of abnormality of a target event series $x'_i$ based on the target event series $x'_i$, the model, and the parameter $\hat{\theta}$ trained by the training unit 105.

Specifically, the prediction unit 108 first acquires the trained parameter $\hat{\theta}$ from the parameter storage unit 106. Next, based on a new event series $\{\chi'_1, \chi'_2, \ldots\}$ that is constituted by $n'_i$ events and the estimated value of the parameter $\hat{\theta}$, the prediction unit 108 calculates the degree of abnormality s' of the target event series x' using the following Expressions (3) and (4).

[Math. 3]

$$Z' = \sum_{i=1}^{n'_i} \lambda(x'_i; \hat{\theta}) - \int_0^T \lambda(x; \hat{\theta})dx \qquad (3)$$

$$s' = f(Z') \qquad (4)$$

Then, the prediction unit 108 gives the calculated degree of abnormality s' to the output unit 109.

The output unit 109 outputs the degree of abnormality s' calculated by the prediction unit 108 as a prediction result.

Operations of Abnormality Detection Device According to Embodiment of Technology of Present Disclosure Next, operations of the abnormality detection device 10 will be described.

Figure 5:
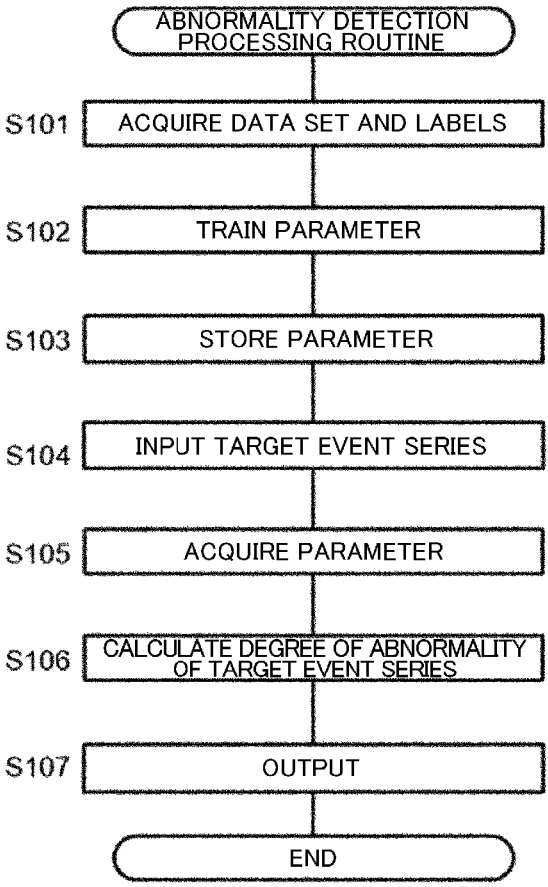
FIG. 5 is a flowchart showing an abnormality detection processing routine of the abnormality detection device according to the embodiment.

FIG. 5 is a flowchart showing a flow of an abnormality detection processing routine performed by the abnormality detection device 10. The abnormality detection processing routine is performed as a result of the CPU 11 reading the abnormality detection program from the ROM 12 or the storage 14, loading the program into the RAM 13, and executing the program.

In step S101, the CPU 11 functioning as the training unit 105 acquires a data set X from the training data storage unit 101 and acquires labels Y from the label storage unit 102.

In step S102, the CPU 11 functioning as the training unit 105 trains a parameter of a model that indicates a relationship between an event series x and a degree of abnormality s of the event series x, based on the data set X and the labels Y acquired in step S101 described above.

In step S103, the CPU 11 functioning as the training unit 105 stores parameters $\hat{\theta}$ and $\hat{\beta}$ trained in step S102 described above, in the parameter storage unit 106.

In step S104, the CPU 11 functioning as the search unit 104 accepts input of a target event series x'_i.

In step S105, the CPU 11 functioning as the prediction unit 108 acquires the trained parameter $\hat{\theta}$ from the parameter storage unit 106.

In step S106, the CPU 11 functioning as the prediction unit 108 calculates the degree of abnormality of the target event series x'_i based on the target event series x'_i, the model, and the parameter $\hat{\theta}$ acquired in step S105 described above.

In step S107, the CPU 11 functioning as the output unit 109 outputs the degree of abnormality s' calculated in step S106 described above as a prediction result.

As described above, the abnormality detection device according to the embodiment of the present disclosure trains a parameter of a model based on a plurality of event series that are event data in a time series and labels that indicate abnormality or normality with respect to event data of each of the plurality of event series, the model outputting a degree of abnormality of a target event series when the target event series is input, the target event series being an event series of which the degree of abnormality is to be predicted, the parameter being trained to optimize an objective function that represents a relationship between a probability of occurrence of an event at each time point in the time series and a degree of abnormality of each of the plurality of event series, and therefore abnormality of event data can be accurately detected with the abnormality detection device.

Note that the present disclosure is not limited by the embodiment described above, and various variations and applications can be made without departing from the gist of the present invention.

In the embodiment described above, a case where the functional units including the training unit and the prediction unit are realized using a single computer has been described, but the training unit and the prediction unit may also be realized using different computers. In this case, a configuration is also possible in which a parameter trained by a computer that includes the training unit is stored in the parameter storage unit, and the parameter stored in the parameter storage unit is read by a computer that includes the prediction unit to execute abnormality detection processing.

Note that the abnormality detection program executed in the embodiment described above as a result of the CPU reading software (program) may also be executed by various processors other than the CPU. Examples of processors used in such cases include a PLD (Programmable Logic Device) such as a FPGA (Field-Programmable Gate Array) of which a circuit configuration can be changed after production and a dedicated electrical circuit that is a processor including a circuit configuration such as an ASIC (Application Specific Integrated Circuit) that is designed to execute specific processing. Also, the abnormality detection program may be executed by one of these various processors or a combination of two or more processors of the same type or different types (e.g., a combination of FPGAs or a combination of a CPU and a FPGA). More specifically, hardware structures of these various processors are electrical circuits that are obtained by combining circuit elements such as semiconductor elements.

In the embodiment described above, a case where the abnormality detection program is stored (installed) in the ROM 12 or the storage 14 in advance has been described, but there is no limitation thereto. The program may also be provided in a state where the program is stored in a non-transitory storage medium such as a CD-ROM (Compact Disk Read Only Memory), a DVD-ROM (Digital Versatile Disk Read Only Memory), or a USB (Universal Serial Bus) memory. The program may also be downloaded from an external device via a network.

Furthermore, the following supplementary notes are disclosed regarding the embodiment described above.

Supplementary Note 1

An abnormality detection device including: a memory; and at least one processor that is connected to the memory, wherein the processor is configured to train a parameter of a model based on a plurality of event series that are event data in a time series and labels that indicate abnormality or normality with respect to event data of each of the plurality of event series, the model outputting a degree of abnormality of a target event series when the target event series is input, the target event series being an event series of which the degree of abnormality is to be predicted, the parameter being trained to optimize an objective function that represents a relationship between a probability of occurrence of an event at each time point in the time series and a degree of abnormality of each of the plurality of event series.

Supplementary Note 2

A non-transitory storage medium in which an abnormality detection program is stored, the abnormality detection program causing a computer to train a parameter of a model based on a plurality of event series that are event data in a time series and labels that indicate abnormality or normality with respect to event data of each of the plurality of event series, the model outputting a degree of abnormality of a target event series when the target event series is input, the target event series being an event series of which the degree of abnormality is to be predicted, the parameter being trained to optimize an objective function that represents a relationship between a probability of occurrence of an event at each time point in the time series and a degree of abnormality of each of the plurality of event series.

REFERENCE SIGNS LIST

10 Abnormality detection device
11 CPU
12 ROM
13 RAM
14 Storage
15 Input unit
16 Display unit
17 Communication interface
19 Bus
101 Training data storage unit
102 Label storage unit
103 Operation unit
104 Search unit
105 Training unit
106 Parameter storage unit

107 Target data storage unit
108 Prediction unit
109 Output unit

The invention claimed is:

1. An abnormality detection device comprising circuitry configured to execute a method comprising:

training a parameter of a model based on a plurality of event series that are event data in a time series and labels that indicate abnormality or normality with respect to event data of each of the plurality of event series, the model outputting a degree of abnormality of a target event series when the target event series is input, the target event series being an event series of which the degree of abnormality is to be predicted, the parameter being trained to optimize an objective function that represents a relationship between a probability of occurrence of an event at each time point in the time series and a degree of abnormality of each of the plurality of event series, wherein the probability of occurrence is expressed with an intensity function of a point process, the objective function is expressed with a linear regression model that is expressed using a likelihood of the point process with respect to each of the plurality of event series, wherein the objective function is expressed as:

$$\mathcal{L} = \sum_{i=1}^{n} D(y_i | f(Z_i; \beta)),$$

and the method further comprising:

training the parameter of the model to maximize the value of the objective function, wherein the parameter is trained based on a plurality of event series in which the plurality of event series comprises event data that indicates abnormality with respect to the event data of each of the plurality of event series.

2. The abnormality detection device according to claim 1, the method further comprising:

accepting input of the target event series; and calculating the degree of abnormality of the target event series based on the target event series, the model, and the trained parameter.

3. The abnormality detection device according to claim 1, wherein the event data includes a record of transactions made in a financial market, and wherein the labels indicate whether a stock value indicator fluctuated.

4. The abnormality detection device according to claim 1, wherein the event data includes a history of boarding and alighting a taxi, and wherein the labels indicate whether a congestion occurred at a time of boarding or alighting.

5. The abnormality detection device according to claim 1, wherein the event data indicates a search log of a route search application, and wherein the labels indicate whether an area on a route was congested.

6. The abnormality detection device according to claim 1, the circuitry configured to execute the method further comprising:

accepting input of the target event series; and calculating the degree of abnormality of the target event series based on the target event series, the model, and the trained parameter.

7. An abnormality detection method comprising:

training a parameter of a model based on a plurality of event series that are event data in a time series and labels that indicate abnormality or normality with respect to event data of each of the plurality of event series, the model outputting a degree of abnormality of a target event series when the target event series is input, the target event series being an event series of which the degree of abnormality is to be predicted, the parameter being trained to optimize an objective function that represents a relationship between a probability of occurrence of an event at each time point in the time series and a degree of abnormality of each of the plurality of event series, wherein the probability of occurrence is expressed with an intensity function of a point process, the objective function is expressed with a linear regression model that is expressed using a likelihood of the point process with respect to each of the plurality of event series, wherein the objective function is expressed as:

$$\mathcal{L} = \sum_{i=1}^{n} D(y_i | f(Z_i; \beta)),$$

and the method further comprising:

training the parameter of the model to maximize the value of the objective function, wherein the parameter is trained based on a plurality of event series in which the plurality of event series comprises event data that indicates abnormality with respect to the event data of each of the plurality of event series.

8. The abnormality detection method according to claim 7, the method further comprising:

accepting input of the target event series; and calculating the degree of abnormality of the target event series based on the target event series, the model, and the trained parameter.

9. The abnormality detection method according to claim 7, wherein the event data includes a record of transactions made in a financial market, and wherein the labels indicate whether a stock value indicator fluctuated.

10. The abnormality detection method according to claim 7, wherein the event data includes a history of boarding and alighting a taxi, and wherein the labels indicate whether a congestion occurred at a time of boarding or alighting.

11. The abnormality detection method according to claim 7, wherein the event data indicates a search log of a route search application, and wherein the labels indicate whether an area on a route was congested.

12. The abnormality detection method according to claim 7, the method further comprising:

accepting input of the target event series; and calculating the degree of abnormality of the target event series based on the target event series, the model, and the trained parameter.

13. A computer-readable non-transitory recording medium storing computer-executable an abnormality detection program instructions that when executed by a processor cause a computer system to execute a method comprising:

training a parameter of a model based on a plurality of event series that are event data in a time series and labels that indicate abnormality or normality with respect to event data of each of the plurality of event series, the model outputting a degree of abnormality of a target event series when the target event series is input, the target event series being an event series of which the degree of abnormality is to be predicted, the parameter being trained to optimize an objective function that represents a relationship between a probability of occurrence of an event at each time point in the time series and a degree of abnormality of each of the plurality of event series, wherein the probability of occurrence is expressed with an intensity function of a point process, the objective function is expressed with a linear regression model that is expressed using a likelihood of the point process with respect to each of the plurality of event series, wherein the objective function is expressed as:

$$\mathcal{L} = \sum_{i=1}^{n} D(y_i | f(Z_i; \beta)),$$

and the method further comprising:

training the parameter of the model to maximize the value of the objective function, wherein the parameter is trained based on a plurality of event series in which the plurality of event series comprises event data that indicates abnormality with respect to the event data of each of the plurality of event series.

14. The computer-readable non-transitory recording medium according to claim 13, wherein the event data includes a record of transactions made in a financial market, and wherein the labels indicate whether a stock value indicator fluctuated.

15. The computer-readable non-transitory recording medium according to claim 13, wherein the event data includes a history of boarding and alighting a taxi, and wherein the labels indicate whether a congestion occurred at a time of boarding or alighting.

16. The computer-readable non-transitory recording medium according to claim 13, the method further comprising:

accepting input of the target event series; and calculating the degree of abnormality of the target event series based on the target event series, the model, and the trained parameter.

17. The computer-readable non-transitory recording medium according to claim 13, the method further comprising:

accepting input of the target event series; and calculating the degree of abnormality of the target event series based on the target event series, the model, and the trained parameter.

* * * * *